United States Patent
Rajagopalan et al.

(10) Patent No.: US 8,224,557 B2
(45) Date of Patent: Jul. 17, 2012

(54) CONTROL SYSTEMS AND METHODS USING GEOMETRY BASED EXHAUST MIXING MODEL

(75) Inventors: Sai S. V. Rajagopalan, Sterling Heights, MI (US); Jason Meyer, Dayton, OH (US); Shawn W. Midlam-Mohler, Columbus, OH (US); Kenneth P. Dudek, Rochester Hills, MI (US); Stephen Yurkovich, Columbus, OH (US); Yann G. Guezennec, Upper Arlington, OH (US)

(73) Assignee: GM Global Technology Operations LLC

( * ) Notice: Subject to any disclaimer, the term of this patent is extended or adjusted under 35 U.S.C. 154(b) by 360 days.

(21) Appl. No.: 12/687,484

(22) Filed: Jan. 14, 2010

(65) Prior Publication Data
US 2011/0073085 A1 Mar. 31, 2011

Related U.S. Application Data

(60) Provisional application No. 61/247,049, filed on Sep. 30, 2009.

(51) Int. Cl.
F02D 41/14 (2006.01)
(52) U.S. Cl. ......... 701/109; 701/103; 123/672; 123/703
(58) Field of Classification Search .................. 701/103, 701/109; 123/672, 703
See application file for complete search history.

(56) References Cited

U.S. PATENT DOCUMENTS

| | | | |
|---|---|---|---|
| 5,041,981 A * | 8/1991 | Sekozawa et al. | 701/1 |
| 6,314,952 B1 * | 11/2001 | Turin et al. | 123/673 |
| 6,550,465 B2 * | 4/2003 | Ueno et al. | 123/679 |
| 6,672,284 B2 * | 1/2004 | Majima | 123/436 |
| 7,647,157 B2 * | 1/2010 | Yasui | 701/103 |
| 7,650,225 B2 * | 1/2010 | Nakagawa et al. | 701/109 |
| 2002/0026930 A1 * | 3/2002 | Ueno et al. | 123/679 |
| 2011/0073087 A1 * | 3/2011 | Meyer et al. | 123/703 |
| 2011/0077844 A1 * | 3/2011 | Meyer et al. | 701/109 |

OTHER PUBLICATIONS

U.S. Appl. No. 12/570,251, filed Sep. 30, 2009, Jason Meyer.
U.S. Appl. No. 12/570,280, filed Sep. 30, 2009, Jason Meyer.
Rajagopalan, Sai S.V., "Model Based Control Design and Rapid Calibration for Air to Fuel Ratio Control of Stoichiometric Engines". Dissertation, The Ohio State University, 2008.

* cited by examiner

Primary Examiner — Erick Solis (57) ABSTRACT

A system includes a cylinder equivalence ratio (EQR) module, a location estimation module, a sensor module, and a fuel control module. The cylinder EQR module determines a first EQR corresponding to a first exhaust gas expelled from a first cylinder and determines a second EQR corresponding to a second exhaust gas expelled from a second cylinder. The location estimation module determines when the first and second exhaust gases mix in an exhaust manifold to form a third exhaust gas having a third EQR. The sensor module estimates an EQR of a fourth exhaust gas based on the third EQR. The fourth exhaust gas is located at an oxygen sensor in the exhaust manifold. The fuel control module controls an amount of fuel supplied to an engine based on a difference between the estimated EQR and an EQR corresponding to measurements from the oxygen sensor.

20 Claims, 8 Drawing Sheets

CONTROL SYSTEMS AND METHODS USING GEOMETRY BASED EXHAUST MIXING MODEL

CROSS-REFERENCE TO RELATED APPLICATIONS

This application claims the benefit of U.S. Provisional Application No. 61/247,049, filed on Sep. 30, 2009.

This application is related to U.S. patent application Ser. Nos. 12/570,251 filed on Sep. 30, 2009 and 12/570,280 filed on Sep. 30, 2009. The disclosures of the above applications are incorporated herein by reference in their entirety.

FIELD

The present disclosure relates to engine control systems and methods, and more particularly to controlling an engine based on the geometry of an exhaust system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons and generate drive torque. A ratio of air to fuel in the A/F mixture may be referred to as an A/F ratio. The A/F ratio may be regulated by controlling at least one of a throttle and a fuel control system. For example, the A/F ratio may be regulated to control torque output of the engine and/or to control emissions produced by the engine.

The fuel control system may include an inner feedback loop and an outer feedback loop. More specifically, the inner feedback loop may use data from an exhaust gas oxygen (EGO) sensor located upstream from a catalytic converter in an exhaust system of the engine system (i.e., a pre-catalyst EGO sensor). The inner feedback may use the data from the pre-catalyst EGO sensor to control a desired amount of fuel supplied to the engine (i.e., a fuel command).

For example, the inner feedback loop may decrease the fuel command when the pre-catalyst EGO sensor senses a rich A/F ratio in exhaust gas produced by the engine. Alternatively, for example, the inner feedback loop may increase the fuel command when the pre-catalyst EGO sensor senses a lean A/F ratio in the exhaust gas. In other words, the inner feedback loop may maintain the A/F ratio at or near an ideal A/F ratio (e.g., 14.7:1 for gasoline engines).

The outer feedback loop may use information from an EGO sensor arranged after the catalytic converter (i.e., a post-catalyst EGO sensor). The outer feedback loop may use data from the post-catalyst EGO sensor to correct (i.e., calibrate) an unexpected reading from the pre-catalyst EGO sensor, the post-catalyst EGO sensor, and/or the catalytic converter. For example, the outer feedback loop may use the data from the post-catalyst EGO sensor to maintain the post-catalyst EGO sensor at a desired voltage level. In other words, the outer feedback loop may maintain a desired amount of oxygen stored in the catalytic converter, thus improving the performance of the exhaust system.

SUMMARY

A system comprises a cylinder equivalence ratio (EQR) module, a location estimation module, a sensor module, and a fuel control module. The cylinder EQR module determines a first EQR corresponding to a first exhaust gas expelled from a first cylinder and determines a second EQR corresponding to a second exhaust gas expelled from a second cylinder. The location estimation module determines when the first and second exhaust gases mix in an exhaust manifold to form a third exhaust gas having a third EQR. The sensor module estimates an EQR of a fourth exhaust gas based on the third EQR. The fourth exhaust gas is located at an oxygen sensor in the exhaust manifold. The fuel control module controls an amount of fuel supplied to an engine based on a difference between the estimated EQR and an EQR corresponding to measurements from the oxygen sensor.

A method comprises determining a first EQR corresponding to a first exhaust gas expelled from a first cylinder and determining a second EQR corresponding to a second exhaust gas expelled from a second cylinder. The method further comprises determining when the first and second exhaust gases mix in an exhaust manifold to form a third exhaust gas having a third EQR. The method further comprises estimating an EQR of a fourth exhaust gas based on the third EQR. The fourth exhaust gas is located at an oxygen sensor in the exhaust manifold. Additionally, the method comprises controlling an amount of fuel supplied to an engine based on a difference between the estimated EQR and an EQR corresponding to measurements from the oxygen sensor.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine control system according to the present disclosure may control an engine to maintain a desired performance and/or emission level based on a model of an exhaust system (hereinafter "exhaust model"). The exhaust model may model transport and mixing of exhaust gas in the exhaust manifold based on geometry (e.g., volume) of the exhaust manifold. More specifically, the exhaust model may model transport of the exhaust gas through pipes of the exhaust manifold using a plugged flow approach. The exhaust model may model mixing of the exhaust gas at junctions between the pipes of the exhaust manifold based on mixing equations. The engine control system may update the exhaust model based on engine events (e.g., a firing of a cylinder).

Figure 1:
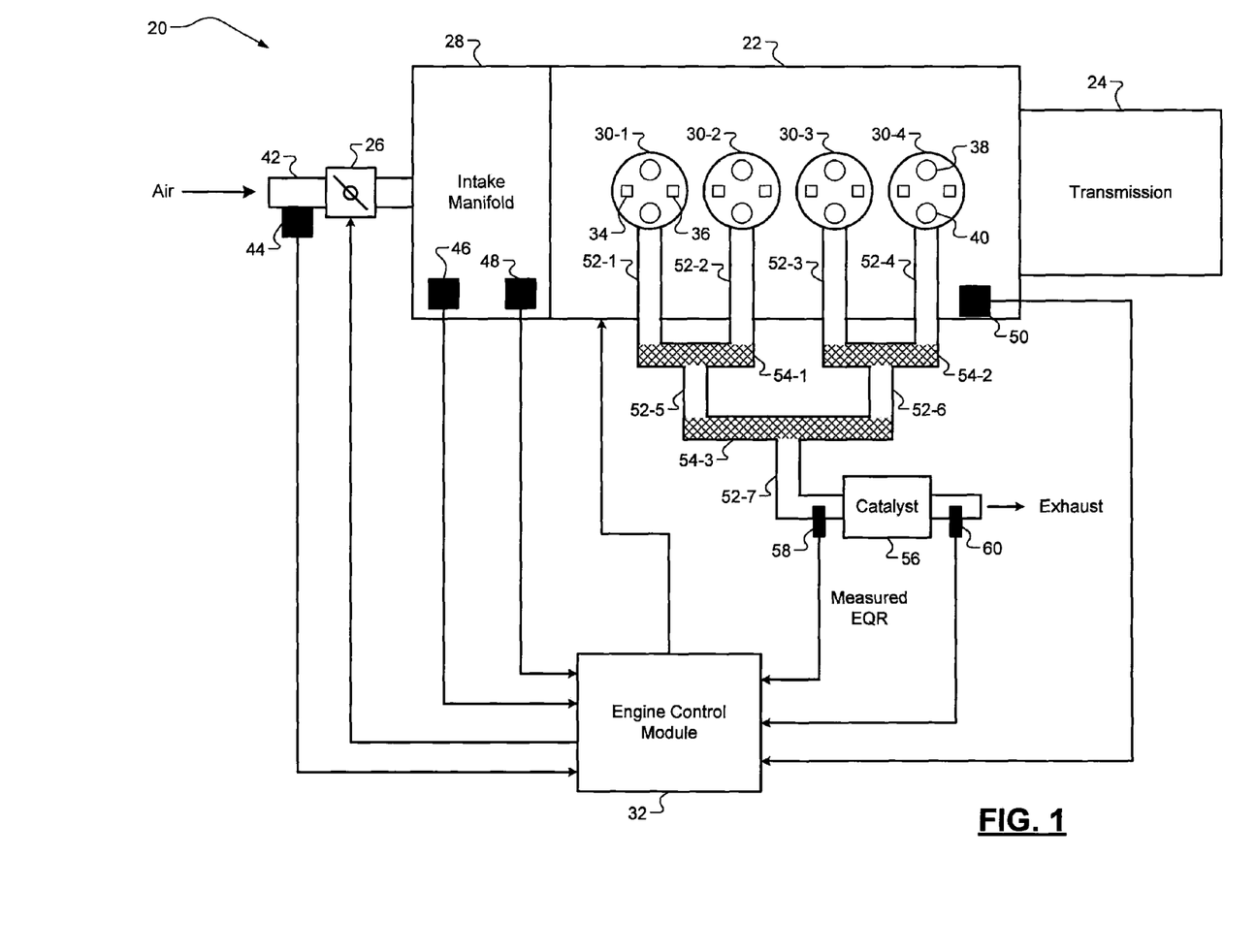
FIG. 1 is a functional block diagram of an engine system according to the present disclosure.

Referring now to FIG. 1, an engine system 20 includes a combustion engine 22 that drives a transmission 24. While a spark ignition engine is illustrated, compression ignition engines are also contemplated. A throttle 26 may regulate airflow into an intake manifold 28. Air within the intake manifold 28 is distributed into cylinders 30-1, 30-2, 30-3, and 30-4 (hereinafter "cylinders 30"). An engine control module 32 actuates fuel injectors 34 to inject fuel into the cylinders 30. Each cylinder 30 may include a spark plug 36 for igniting the air/fuel mixture. Alternatively, the air/fuel mixture may be ignited by compression in a compression ignition engine. Although FIG. 1 depicts four cylinders 30, the engine 22 may include additional or fewer cylinders 30. The engine 22 may also provide for an active fuel management system (not shown) that deactivates intake valves 38 and exhaust valves 40.

The engine control module 32 communicates with components of the engine system 20. Components of the engine system 20 include the engine 22, sensors, and actuators as discussed herein.

Air is passed from an inlet 42 through a mass airflow (MAF) sensor 44. The MAF sensor 44 generates a MAF signal that indicates a mass of air flowing into the intake manifold 28. A manifold pressure (MAP) sensor 46 is positioned in the intake manifold 28 between the throttle 26 and the engine 22. The MAP sensor 46 generates a MAP signal that indicates manifold absolute air pressure. An intake air temperature (IAT) sensor 48 located in the intake manifold 28 generates an IAT signal that indicates intake air temperature. An engine crankshaft (not shown) rotates at engine speed or a rate that is proportional to the engine speed. A crankshaft sensor 50 generates a crankshaft position (CSP) signal that may indicate the rotational speed and position of the crankshaft.

The intake valve 38 selectively opens and closes to enable air to enter the cylinder. An intake camshaft (not shown) regulates a position of the intake valve 38. A piston (not shown) compresses the air/fuel mixture within the cylinder 30. The piston drives the crankshaft to produce drive torque. Combustion exhaust within the cylinder 30 is forced out through an exhaust manifold when the exhaust valve 40 is in an open position. An exhaust camshaft (not shown) regulates a position of the exhaust valve 40. Although single intake and exhaust valves 38, 40 are illustrated, the engine 22 may include multiple intake and exhaust valves 38, 40 per cylinder.

The engine system 20 includes an exhaust manifold. The exhaust manifold is represented as sections 52-1, 52-2, 52-3, 52-4, 52-5, 52-6, and 52-7 (collectively "sections 52") and confluence junctions 54-1, 54-2, and 54-3 (collectively "junctions 54"). Each of the sections 52 may be referred to singularly as a section 52. Each of the junctions may be referred to singularly as a junction 54.

The sections 52 may represent piping of the exhaust manifold. Accordingly, the sections 52 may route exhaust gas from respective cylinders 30 to a catalyst (e.g., a three-way catalyst) 56. For example, sections 52-1, 52-5, and 52-7 may route exhaust gas from cylinder 30-1 to the catalyst 56. Sections 52-3, 52-6, and 52-7 may route exhaust gas from cylinder 30-3 to the catalyst 56.

The sections 52 are linked at the junctions 54. The junctions 54 are represented by hashed regions in FIG. 1. Each of the junctions 54 may represent a portion of the exhaust manifold where two of the sections 52 are joined. Accordingly, exhaust gas from multiple sections 52 may mix at the junctions 54. For example, exhaust gas from sections 52-1, 52-2, and 52-5 may mix at junction 54-1.

The exhaust manifold illustrated in FIG. 1 is a 4-2-1 manifold configuration. In other words, the exhaust manifold illustrated in FIG. 1 includes four sections 52-1, 52-2, 52-3, and 52-4 that route exhaust gas to two separate junctions 54-1, 54-2 which further route exhaust gas to a single junction 54-3. While the exhaust model calibration system 100 of the present disclosure is described as using the engine 22 that includes 4 cylinders 30, the exhaust model calibration system 100 may apply to engine systems that include more or less than 4 cylinders 30. While the exhaust model calibration system 100 is described using the 4-2-1 manifold configuration, the calibration system may apply to other manifold configurations (e.g., a 4-1 manifold configuration).

A pre-catalyst oxygen sensor 58 (hereinafter "pre-cat sensor 58") is located in section 52-7, upstream from the catalyst 56. The pre-cat sensor 58 may generate a signal (e.g., a voltage) that indicates an amount of oxygen in the exhaust gas relative to an amount of oxygen in the atmosphere. The engine control module 32 may determine an equivalence ratio (EQR) based on the signal generated by the pre-cat sensor 58. The EQR may indicate an air/fuel ratio of the air/fuel mixture combusted in the cylinder 30. Accordingly, the signal generated by the pre-cat sensor 58 may be referred to as a "measured EQR."

The engine system 20 may include an oxygen sensor 60 downstream from the catalyst 56 (hereinafter "post-cat sensor 60") that generates post-cat signals. The engine control module 32 may determine an efficiency of the catalyst 56 based on signals received from the pre-cat sensor 58 and the post-cat sensor 60.

The engine control module 32 receives input signals from the engine system 20. The input signals may include, but are not limited to, the MAF, MAP, IAT, pre-cat sensor 58, and post-cat sensor 60 signals. The engine control module 32 processes the input signals and generates timed engine control commands that are output to the engine system 20. For example, engine control commands may actuate the throttle 26, the fuel injectors 34, and the spark plugs 36.

The engine control module 32 may control components of the engine 22 based on the measured EQR and an exhaust model that models the transport and mixing of exhaust gas in the exhaust manifold. For example, the engine control module 32 may control fuel injectors 34 based on the measured EQR and the exhaust model. The exhaust model may model EQR at the location of the pre-cat sensor 58. In other words, the exhaust model may predict EQR at the location of the pre-cat sensor 58. The EQR predicted at the location of the pre-cat sensor 58 may be referred to hereinafter as an "expected EQR."

The engine control module 32 may control the fuel injectors 34 based on the measured EQR and the expected EQR. For example, the engine control module 32 may control the fuel injectors 34 in order to minimize a difference between the measured EQR and the expected EQR.

The exhaust model may model the composition of the exhaust gas flowing through the exhaust manifold. Specifically, the exhaust model may model EQR indicated by the exhaust gas (hereinafter "EQR of the exhaust gas") at different locations in the exhaust manifold. The exhaust model may model EQR of the exhaust gas in the exhaust manifold based on an amount of fuel to be injected into the cylinders 30 and an amount of air in the cylinders 30 during combustion.

The exhaust model may model transport of the exhaust gas in the exhaust manifold based on the geometry of the exhaust manifold (hereinafter "exhaust geometry"). For example, the exhaust model may model transport of the exhaust gas through the sections 52 of the exhaust manifold based on the geometry of the sections 52. More specifically, the exhaust model may model EQR of the exhaust gas in the exhaust manifold based on the geometry of the exhaust manifold. For example, the exhaust model may model EQR of exhaust gas expelled from the cylinder 30-1 through the section 52-1 based on the geometry of the section 52-1.

The exhaust model may model mixing of the exhaust gas at the junctions 54. For example, the exhaust model may model mixing of exhaust gas of sections 52-1, 52-2, and 52-5 at junction 54-1. The exhaust model may be referred to as a "gas mixing and transport model" since the exhaust model models both the transport and mixing of the exhaust gas.

Figure 2:
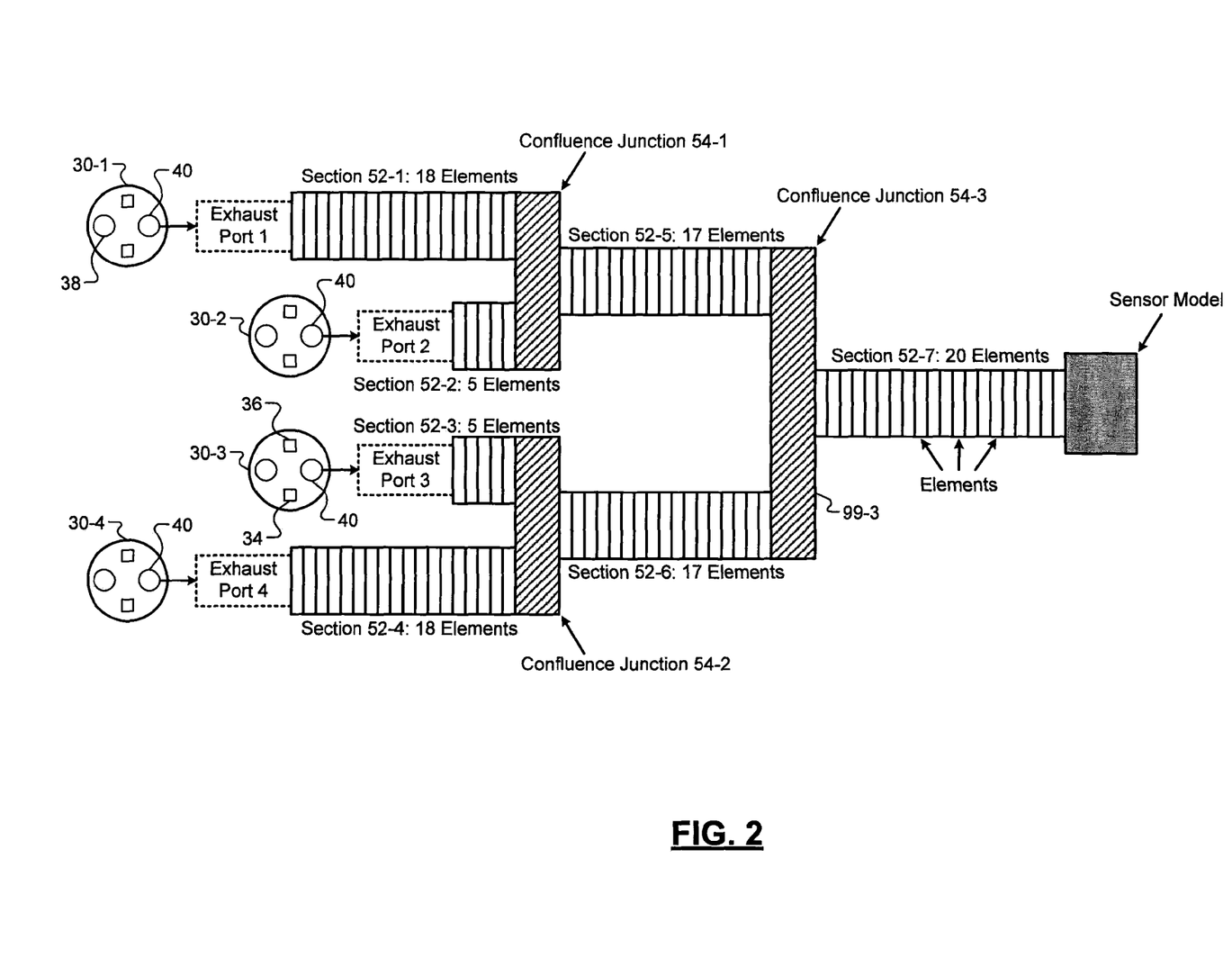
FIG. 2 illustrates an exhaust model according to the present disclosure.

Referring now to FIG. 2, an exemplary exhaust geometry for a four cylinder engine is shown. The exhaust geometry may be based on the exhaust manifold of FIG. 1. Accordingly, the engine control module 32 may include an exhaust model based on the exhaust geometry of FIG. 2. While the exhaust model of FIG. 2 is based on a 4-2-1 exhaust geometry, the exhaust model may be based on other exhaust geometries. For example, other exhaust geometries may be constructed that correspond to a 4-1 exhaust manifold configuration.

The exhaust model models each of the sections 52 as a group of elements. For example, section 52-1 includes 18 elements. The exhaust model may model the flow of exhaust gas from exhaust ports 1-4 through a corresponding section 52. The exhaust model may model the mixing of the exhaust gas at each of the junctions 54. The exhaust model may also model a response of the pre-cat sensor after the last element of section 52-7.

Each of the elements represents a portion of the volume of the exhaust manifold. The volume of the exhaust manifold may be the volume of the exhaust manifold from the exhaust ports to the location of the pre-cat sensor 58. Each of the elements may be based on the volume ratio of the section 52 to the total volume of the exhaust manifold.

The exhaust model of FIG. 2 includes 100 elements. Accordingly, each element may represent $1/100^{th}$ of the volume of the exhaust manifold. Specifically, section 52-1 includes 18 elements since section 52-1 accounts for 18% of the volume of the exhaust manifold.

The exhaust model models the flow of exhaust gas through the sections. The exhaust model may model the flow of the exhaust gas through the sections 52 using a plugged flow approach. The plugged flow approach may assume that the exhaust gas moves in packets with respect to engine events until the exhaust gas reaches one of the junctions 54. For example, it may be assumed that the flow of exhaust gas through the sections 52 and the mixing of the exhaust gas in the junctions 54 is modeled on a per element basis.

A mass of exhaust gas may be expelled from a cylinder 30 into a section 52 after combustion. The mass of the exhaust gas may be based on an amount of air in the cylinder 30 and the amount of fuel injected into the cylinder 30. Accordingly, the mass of the exhaust gas may be based on an air-per-cylinder (APC) value. The mass of the exhaust gas expelled from the cylinder 30 may occupy a volume (i.e., a number of elements) according to the exhaust model. Specifically, the exhaust model may model a number of elements filled by the exhaust gas that is exhausted from the cylinder 30 based on APC and the amount of fuel injected into the cylinder 30. The exhaust model may determine the EQR of the exhaust gas expelled from the cylinder 30 based on the APC value and the amount of fuel injected into the cylinder 30.

The exhaust model may model movement of exhaust gas through a section 52 when a cylinder 30 corresponding to the section 52 exhausts exhaust gas into the section 52. For example, the exhaust model may model movement of exhaust gas through section 52-1 when cylinder 30-1 expels exhaust gas into section 52-1.

The exhaust model may model exhaust gas moving through a section in the following manner. Using cylinder 30-1 and section 52-1 as an example, the exhaust model may determine a first mass of exhaust gas and a corresponding first volume of exhaust gas expelled into section 52-1 from cylinder 30-1. For example, the first volume of exhaust gas may fill 10 elements of section 52-1. The 10 elements filled by the first mass of exhaust gas may be referred to as the "first group of elements." The exhaust model may determine a first EQR corresponding to the first volume of exhaust gas. The exhaust model may model each element of the first group of elements as having the first EQR.

A second mass of exhaust gas may be expelled into section 52-1 at a later time. The exhaust model may determine a second volume of exhaust gas based on the second mass of exhaust gas expelled into section 52-1. For example, the second volume of exhaust gas may fill 12 elements of section 52-1. The 12 elements filled by the second mass of exhaust gas may be referred to as the "second group of elements." The exhaust model may determine a second EQR corresponding to the second volume of exhaust gas. The exhaust model may model each element of the second group of elements as having the second EQR.

The first group of elements may fill the first 10 elements (i.e., the first 10 elements after exhaust port 1) when the first volume of exhaust gas is exhausted. The second group of elements may displace the first group of elements when the second volume of exhaust gas is exhausted. The first 4 elements of the first group of elements may be shifted into section 52-5 when the second group of elements is exhausted into section 52-1. Accordingly, section 52-1 may include the second group of elements and 6 elements corresponding to the first group of elements. The 4 elements shifted into section 52-5 may mix with elements of section 52-2 as described herein.

For example only, the exhaust model may determine the number of elements occupied by the gas exhausted from a particular cylinder 30 during the exhaust stroke based on the following equation:

$$V_{gas,exh} = \frac{Air_{est} \times T_{exh} \times R}{P_{exh}} \quad \text{(Eq. 1)}$$

where $Air_{est}$ is an estimate of the amount of air trapped in the cylinder 30 that is exhausting, $T_{exh}$ an the average temperature of the exhaust system, $P_{exh}$ is an average pressure in the exhaust manifold, and R is a gas constant.

The exhaust model models mixing of the exhaust gas between the sections 52 at each of the junctions 54. The exhaust model models mixing of the last elements of a section 52 entering a junction 54 with the first element of a section 52 exiting the junction 54. In other words, the exhaust model models mixing of the elements adjacent to the respective junction 54.

Elements may be identified using numbers to indicate the position of the element in the section 52. For example, element 18 of section 52-1 and element 5 of section 52-2 may be the elements adjacent to junction 54-1. Element 18 of section 52-1 and element 5 of section 52-2 may be referred to as the last elements of section 52-1 and 52-2, respectively. Element 1 of section 52-5 and element 1 of section 52-6 may be the elements adjacent to junctions 54-1 and 54-2, respectively. Element 1 of section 52-5 and element 1 of section 52-6 may be referred to as the first elements of sections 52-5 and 52-6, respectively. Element 17 of section 52-5 and element 17 of section 52-6 may be the elements adjacent to junction 54-3. Element 17 of section 52-5 and element 17 of section 52-6 may be referred to as the last elements of sections 52-5 and 52-6, respectively. Element 1 of section 52-7 may be the element adjacent to junction 54-3. Element 1 of section 52-7 may be referred to as the first element of section 52-7.

Element 20 of section 52-7 may be the element adjacent to the sensor model. Element 20 of section 52-7 may be referred to as the last element of section 52-7. With respect to junction 54-1, the exhaust model models the mixing of the last elements of section 52-1 and 52-2 with the first element of section 52-5. With respect to junction 54-2, the exhaust model models the mixing of the last elements of section 52-3 and 52-4 with the first element of section 52-6. With respect to junction 54-3, the exhaust model models the mixing of the last elements of sections 52-5 and 52-6 with the first element of section 52-7.

The exhaust model may model transport and mixing of the exhaust gas in a crank angle based domain. For example, the exhaust model may model the transport of exhaust gases based on discrete engine events. A discrete engine event may include firing of a cylinder 30. Accordingly, the exhaust model may model the transport and mixing of the exhaust gas based on when the cylinders 30 fire. Alternatively, the exhaust model may model the transport and mixing of the exhaust gas based on other engine events. Other engine events may include a piston passing a predetermined position (e.g., top dead center or bottom dead center) or an angle of the crankshaft.

The exhaust model may model EQR detected at the pre-cat sensor 58. A part of the exhaust model that models the EQR at the pre-cat sensor 58 may be called a "sensor model." The sensor model may determine EQR at the pre-cat sensor 58 in the crank angle based domain.

The sensor model may model the EQR at the pre-cat sensor 58 based on various parameters. The parameters may include, but are not limited to, a time constant of the sensor, the engine speed, and engine events.

The modeled EQR detected at the pre-cat sensor 58 may be modeled based on a first order system. For example only, the EQR modeled at the pre-cat sensor 58 may be modeled using the following equation for the exhaust geometry of the four cylinder engine 22 of FIG. 2:

$$EQR_{meas}(k) = \quad \text{(Eq. 2)}$$
$$\frac{\tau_{Sensor}N}{\tau_{Sensor}N + 30}EQR_{meas}(k-1) + \frac{30}{\tau_{Sensor}N + 30}EQR_{@EGO}(k)$$

where $EQR_{meas}(k)$ is the expected EQR (i.e., a model based prediction of the EQR detected by the pre-cat sensor 58). $\tau_{Sensor}$ may represent a time constant of the pre-cat sensor 58. $\tau_{Sensor}$ may be based on a response of the pre-cat sensor 58 to a change in EQR. For example, $\tau_{Sensor}$ may be based on a first order time response of the pre-cat sensor 58 to a step input EQR. $\tau_{Sensor}$ may be a value provided by a manufacturer of the pre-cat sensor 58. Alternatively, $\tau_{Sensor}$ may be approximated (e.g., as 0.06). N is the engine speed in revolutions per minute.

$EQR_{meas}(k-1)$ corresponds to the $EQR_{meas}$ due to a prior engine event. $EQR_{@EGO}(k)$ is the EQR at the pre-cat sensor 58 as determined by the exhaust model (i.e., the EQR after element 20 of section 52-7). Accordingly, the geometry portion of the exhaust model determines $EQR_{@EGO}(k)$ and the sensor model determines $EQR_{meas}(k)$ based on $EQR_{@EGO}(k)$ and $EQR_{meas}(k-1)$.

The exhaust model may model mixing of exhaust gas at the junctions 54. A part of the exhaust model that models the mixing of exhaust gas at the junctions 54 may be called a "mixing model." The mixing model may model the mixing at the junctions 54 in the crank angle based domain based on EQR at elements adjacent to the junctions 54 and coefficients that describe the interaction between the elements adjacent to the junctions 54.

Figure 3:
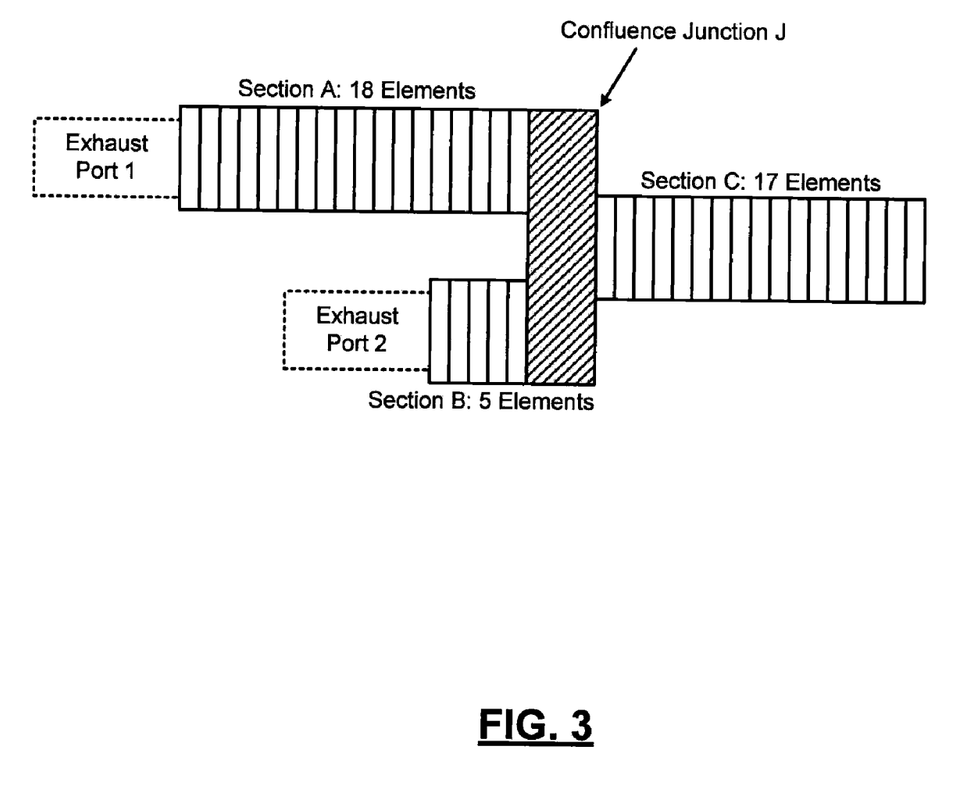
FIG. 3 illustrates an exemplary confluence junction between three sections of the exhaust model according to the present disclosure.

Referring now to FIG. 3, an exemplary junction J between sections A, B, and C illustrates a general mixing model applicable for a junction 54. The mixing model models a mixing of exhaust gas at junction J based on which junction includes exhaust gas flow. For example, the mixing model models the mixing of exhaust gas between sections A, B, and C at junction J excited by flow of exhaust gas through section A. The mixing model also models the mixing of exhaust gas between sections A, B, and C at junction J excited by flow of exhaust gas through section B.

The mixing model may model the mixing of exhaust gas between sections A, B, and C at junction J excited by flow of exhaust through section A using the following equation:

$$EQR_{C,1}(k)=\alpha_{A,C}EQE_{C,1}(k-1)+\beta_{A,B}EQR_{B,last}(k)+(1-\alpha_{A,C}-\beta_{A,B})EQR_{A,last}(k) \quad \text{(Eq. 3)}$$

where k is an index of a current engine event, $EQR_{C,1}$ is the EQR of the first element of section C, $EQR_{B,last}$ is the EQR of the last element of section B, and $EQR_{A,last}$ is the EQR of the last element of section A. $\alpha_{A,C}$ may be a coefficient of the mixing model that models gases mixing from section A into section C. $EQR_{C,1}(k-1)$ may be the EQR of the first element of section C after a previous engine event. Accordingly, $\alpha_{A,C}$ may describe mixing in terms of recursion. $\beta_{A,B}$ may be a coefficient that describes the mixing between section A and section B.

The mixing model may apply Eq. 3 to each element that is shifted from section A through junction J into section C. For example, if 5 elements are shifted from section A into section C, the mixing model may apply Eq. 3 to each of the 5 elements shifted into section C.

The mixing model may model the mixing of exhaust gas between sections A, B, and C at junction J excited by flow of exhaust through section B using the following equation:

$$EQR_{C,1}(k)=\alpha_{B,C}EQR_{C,1}(k-1)+\beta_{B,A}EQR_{A,last}(k)+(1-\alpha_{B,C}-\beta_{B,A})EQR_{B,last}(k) \quad \text{(Eq. 4)}$$

$\alpha_{B,C}$ may be a coefficient for the mixing models that models gases mixing from section B into section C. $EQR_{C,1}(k-1)$ may be the EQR of the first element of section C after a previous engine event. Accordingly, $\alpha_{B,C}$ may describe mixing in terms of recursion. $\beta_{B,A}$ may be a coefficient that describes the mixing between section B and section A.

The mixing model may apply Eq. 4 to each element that is shifted from section B through junction J into section C. For example, if 5 elements are shifted from section B into section C, the mixing model may apply Eq. 4 to each of the 5 elements shifted into section C.

The coefficients corresponding to junction J (i.e., $\alpha_{A,C}$, $\beta_{A,B}$, $\alpha_{B,C}$ and $\beta_{B,A}$) may be determined based on a calibration operation described herein.

Applying Eq. 3 to junction 54-1 of sections 52-1, 52-2, and 52-5 of FIG. 2, mixing of the exhaust gas at junction 54-1 excited by flow through section 52-1 may be modeled using the following equation:

$$EQR_{5,1}(k)=\alpha_{1,5}EQR_{5,1}(k-1)+\beta_{2,5}EQR_{2,5}(k)+(1-\alpha_{1,5}-\beta_{2,5})EQR_{1,18}(k) \quad \text{(Eq. 5)}$$

where $EQR_{5,1}$ is the EQR of the first element of section 52-5, $EQR_{2,5}$ is the EQR of the last element of section 52-2, and $EQR_{1,18}$ is the EQR of the last element of section 52-1. $\alpha_{1,5}$ may be a coefficient for the mixing model that models mixing of exhaust gases flowing from section 52-1 into section 52-5. $EQR_{5,1}(k-1)$ may be the EQR of the first element of section 52-5 after a previous engine event. $\beta_{2,5}$ may be a coefficient that describes mixing between section 52-1 and section 52-2.

Mixing at each of the junctions 54 may be described by 2 equations, one equation for each section 52 that excites flow through the exhaust manifold. Each of the two equations include $\beta$ and $\beta$ coefficients. Accordingly, mixing at the three junctions of the 4-2-1 exhaust configuration of FIG. 2 may be modeled using 12 coefficients.

Figure 4A:
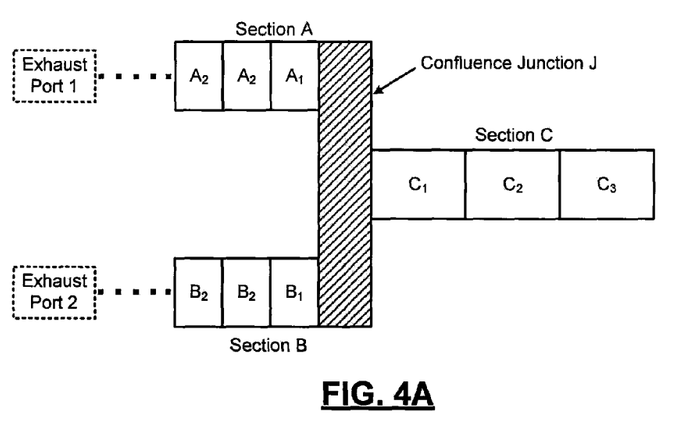
FIG. 4A illustrates a composition of exhaust gas before the exhaust gas is mixed at a confluence junction according to the present disclosure.
Figure 4B:
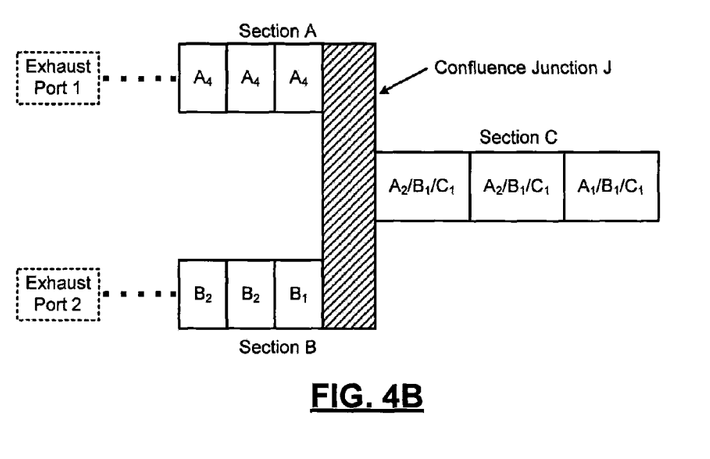
FIG. 4B illustrates a composition of exhaust gas after the exhaust gas is mixed at the confluence junction J according to the present disclosure.

Referring now to FIGS. 4A-4B, implementation of the mixing equations (e.g., Eq. 3 and Eq. 4) is shown. FIG. 4A illustrates the EQR of the elements of each section before elements are mixed at junction J. The EQR of the elements of section A ($A_2$, $A_2$, $A_1$), section B ($B_2$, $B_2$, $B_1$) and section C ($C_1$, $C_2$, $C_3$) are shown. For example, elements having values $A_1$ and $A_2$ were expelled from different exhaust strokes at exhaust port 1, and elements having values of $B_1$ and $B_2$ were expelled from different exhaust strokes at exhaust port 2.

FIG. 4B illustrates the EQR of the elements after the flow of exhaust gas into the elements section A. The elements exhausted into section A have the same EQR ($A_4$) since the three elements were exhausted from the same combustion event. The resulting EQRs associated with section C were obtained as follows. A first mixed element ($A_1/B_1/C_1$) resulted from a mixture of element $A_1$, element $B_1$, and element $C_1$. The first mixed element was then shifted forward by a second mixed element ($A_2/B_1/C_1$). The second mixed element resulted from a mix of element $A_2$, element $B_1$, and element $C_1$. The second mixed element was then shifted forward by a third mixed element ($A_2/B_1/C_1$). The third mixed element resulted from a mixture of the second element $A_2$, element $B_1$, and element $C_1$. The exhaust model illustrated in FIGS. 4A-4B may be updated for each engine event that excites exhaust flow in either section A or section B.

Figure 5:
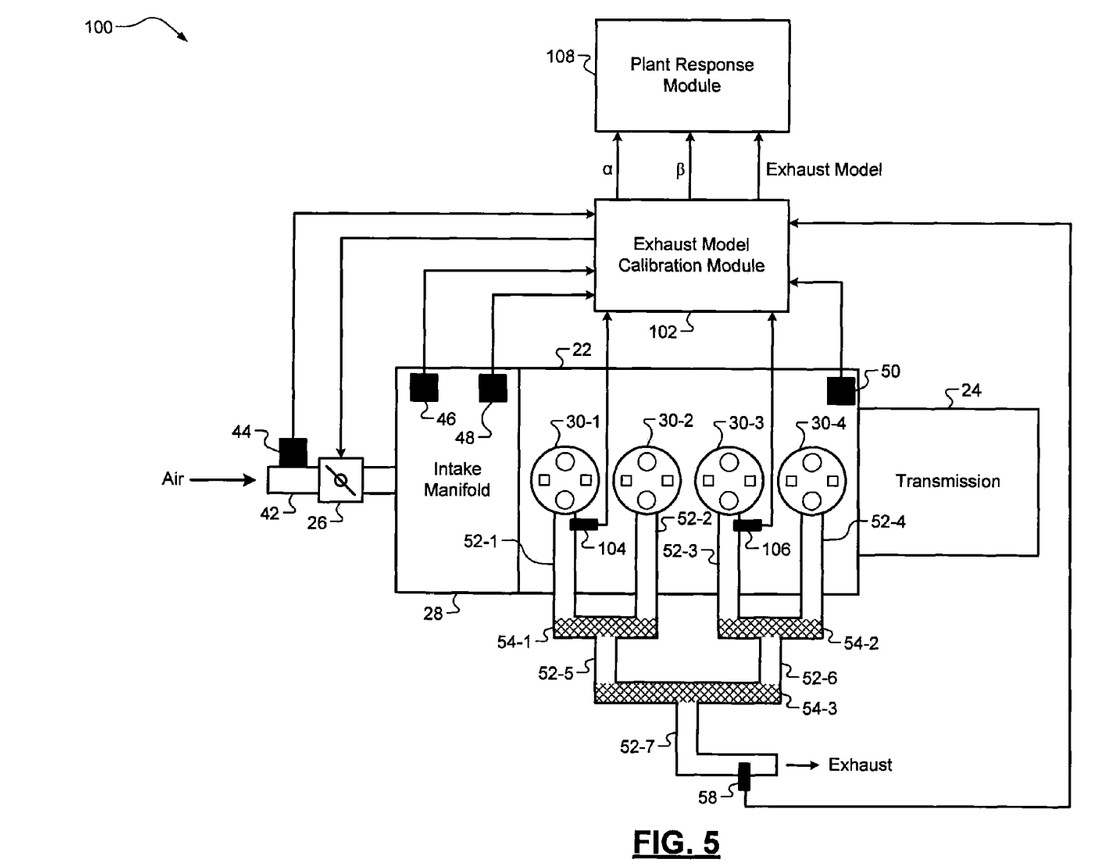
FIG. 5 is a functional block diagram of an exhaust model calibration system according to the present disclosure.

Referring now to FIG. 5, an exhaust model calibration system 100 includes an exhaust model calibration module 102, a first oxygen sensor 104, and a second oxygen sensor 106. The first and second oxygen sensors 104, 106 may be located near the exhaust ports of sections 52-1, 52-3, respectively. Accordingly, the first and second oxygen sensors 104, 106 may measure EQR of the exhaust gas expelled from cylinders 30-1, 30-3, respectively.

The exhaust model calibration module 102 performs a calibration operation in order to determine the mixing coefficients ($\beta$ and $\beta$) for the exhaust model. The calibration operation may involve determining the mixing coefficients by measuring the EQR of the exhaust gas at the locations of the first oxygen sensor 104, the second oxygen sensor 106, and the pre-cat sensor 58 while modifying fueling to the cylinders 30. For example, the calibration operation may include measuring the EQR of the exhaust gas at the locations of the sensors 104, 106, 58 while operating the engine 22 over a range of operating conditions. For example only, the calibration operation may include measuring the EQR of the exhaust gas during a federal test procedure (FTP) drive cycle.

A plant response module 108 may receive the exhaust model including the mixing coefficients ($\alpha$ and $\beta$) determined during the calibration operation. The exhaust model may be referred to hereinafter as a calibrated exhaust model when the exhaust model includes the mixing coefficients ($\alpha$ and $\beta$) determined during the calibration procedure.

Figure 6:
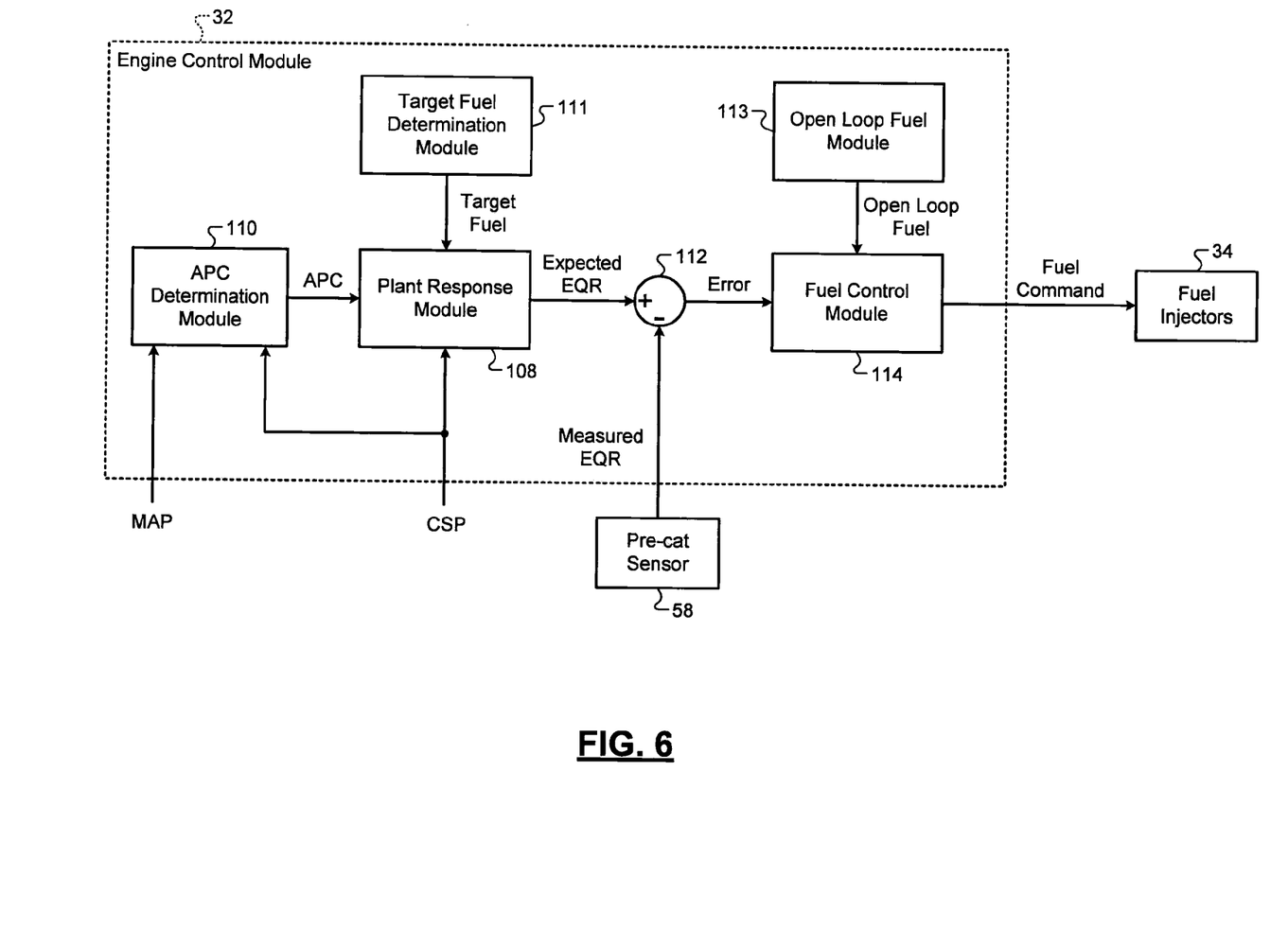
FIG. 6 is a functional block diagram of an engine control module that implements the exhaust model according to the present disclosure.

Referring now to FIG. 6, the engine control module 32 includes an APC determination module 110, a target fuel determination module 111, the plant response module 108, a difference module 112, an open loop fuel module 113, and a fuel control module 114. The APC determination module 110 determines an amount of air drawn into a cylinder 30. For example, the APC determination module 110 may determine the amount of air drawn into a cylinder 30 based at least one of MAP, and RPM signals. The target fuel determination module 111 determines a target fuel to be injected into the cylinders 30 based on a desired performance of the engine system 20 and/or a desired emission level of the engine system 20.

The plant response module 108 determines the expected EQR at the pre-cat sensor 58 based on the target fuel to be injected into the cylinders 30 and the amount of air drawn into the cylinders 30. The plant response module 108 implements the calibrated exhaust model. The plant response module 108 determines the expected EQR based on the calibrated exhaust model. Accordingly, the plant response module 108 may update the calibrated exhaust model in the crank angle domain based on CSP signals.

The difference module 112 determines a difference (i.e., error) between the expected EQR at the pre-cat sensor 58 and the measured EQR received from the pre-cat sensor 58. The fuel control module 114 may control the amount of fuel injected into the cylinders 30 based on the error. For example, the fuel control module 114 may generate a fuel command to control the amount of fuel injected into the cylinders 30 in order to minimize the error. The open loop fuel module 113 may determine an open loop fuel command based on a lookup table. Accordingly, the fuel control module 114 may determine the fuel command based on both the open loop fuel command and the error.

Referring back to FIG. 5, the exhaust model calibration module 102 may determine the mixing coefficients using a variety of calibration operations. The calibration operation used may depend on a configuration of the exhaust model calibration system 100. The configuration of the exhaust model calibration system 100 may refer to a placement of the first and second oxygen sensors 104, 106 sensors and/or a number of oxygen sensors used to determine EQR in the exhaust manifold. While the exhaust model calibration system 100 of FIG. 5 illustrates three oxygen sensors 58, 104, 106, more oxygen sensors may be added to the exhaust model calibration system 100. For example, the exhaust model calibration system 100 may include oxygen sensors in each of the sections 52 and junctions 54. Accordingly, the exhaust model calibration module 102 may determine the mixing coefficients based on a calibration procedure including oxygen sensors in each of the sections 52 and junctions 54. However, placing oxygen sensors in each of the sections 52 and junctions 54 may be unnecessary or infeasible. Accordingly, the exhaust model calibration system 100 according to the present disclosure may determine the mixing coefficients using three oxygen sensors 58, 104, 106.

The exhaust model calibration system 100 may determine the mixing coefficients based on EQR determined by the first oxygen sensor 104, the second oxygen sensor 106, and the pre-cat sensor 58. The exhaust model calibration module 102 may determine the mixing coefficients based on an assumption that the sections 52-2, 52-4 that are not instrumented with oxygen sensors behave similarly to the sections 52-1, 52-3 that are instrumented with oxygen sensors 104, 106.

However, the sections 52-2, 52-4 that are not instrumented with oxygen sensors may not behave similarly to the sections 52-1, 52-3 that are instrumented with the oxygen sensors 104, 106. Accordingly, the exhaust model calibration module 102 may include further modeling parameters (e.g., a breathing model) to compensate for asymmetrical behavior of the sections 52.

The breathing model may include parameters that compensate for the asymmetrical behavior of the sections 52. For example, the exhaust model calibration module 102 may determine the mixing coefficients based on EQR determined by the first oxygen sensor 104, the second oxygen sensor 106, and the pre-cat sensor 58 and the breathing model. For example, the breathing model may be described by the following equations:

$$APC_2 = APC + \Delta APC_2 \qquad (Eq.\ 6)$$

$$APC_4 = APC + \Delta APC_4 \qquad (Eq.\ 7)$$

Where $APC_2$ and $APC_4$ are APC values corresponding to cylinder 30-2 and cylinder 30-4, respectively. $APC_2$ and $APC_4$ may be based on the measured APC (APC) corresponding to each of the cylinders 30-2 and 30-4 and calibration variables $\Delta APC_2$ and $\Delta APC_4$. The calibration variables $\Delta APC_2$ and $\Delta APC_4$ may be adjusted when calibrating the exhaust model during the calibration operation to account for breathing differences among the cylinders 30. The calibration parameters $\Delta APC_2$ and $\Delta APC_4$ may be based on MAP signals and RPM signals. The following equation may describe the calibration variables:

$$\Delta APC_A = c_{A1}MAP + c_{A2}RPM + c_{A3}MAP \times RPM + c_{A4}MAP^2 + c_{A5}RPM^2 \qquad (Eq.\ 8)$$

Where $c_{A1}$-$c_{A5}$ are constants that may be adjusted during the calibration operation. In addition to $\Delta APC_2$ and $\Delta APC_4$, calibration parameters corresponding to the sections 52-1, 52-3 that are instrumented may be modeled. Accordingly, the breathing model may include the following equations:

$$APC_1 = APC + \Delta APC_1 \qquad (Eq.\ 9)$$

$$APC_3 = APC + \Delta APC_3 \qquad (Eq.\ 10)$$

The breathing model may estimate the EQR of the cylinders where sensors are not present based on measurements from sections where oxygen sensors are present. For example, the estimation may be based on the following equation:

$$EQR_1 = EQR_2 \left[ \frac{APC + \Delta APC_2}{APC + \Delta APC_1} \right] \qquad (Eq.\ 11)$$

The calibration operation including the breathing model may be performed using an optimization algorithm such as a genetic algorithm. A cost function of the genetic algorithm optimization may be the second norm of the error between the EQR predicted by the exhaust model and the measured EQR at the location of the pre-cat sensor 58.

The exhaust model may be further simplified in some cases. Experimentally, the calibrated exhaust model may include similar mixing coefficients. For example, $\alpha_{A,C}$ may be roughly equal to $\alpha_{B,C}$. Accordingly, a single value ($\alpha_C$) may replace $\alpha_{A,C}$ and $\alpha_{B,C}$ in the exhaust model. In some instances, $\beta_{A,B}$ may be roughly equal to $\beta_{B,A}$. Accordingly, a single value $\beta_C$ may replace $\beta_{A,B}$ and $\beta_{B,A}$ in the exhaust model.

In some scenarios, the exhaust model may be further simplified. For example, $\alpha_{A,C}$ and $\alpha_{B,C}$ may not significantly affect the expected EQR determined by the exhaust model. Accordingly, $\alpha_{A,C}$ and $\alpha_{B,C}$ may be removed from equations Eq. 3 and Eq. 4, resulting in the following simplified mixing equations:

$$EQR_{C,1}(k) = \beta_C EQR_{B,last}(k) + (1-\beta_C)EQR_{A,last}(k) \qquad (Eq.\ 12)$$

$$EQR_{C,1}(k) = \beta_C EQR_{A,last}(k) + (1-\beta_C)EQR_{B,last}(k) \qquad (Eq.\ 13)$$

Figure 7:
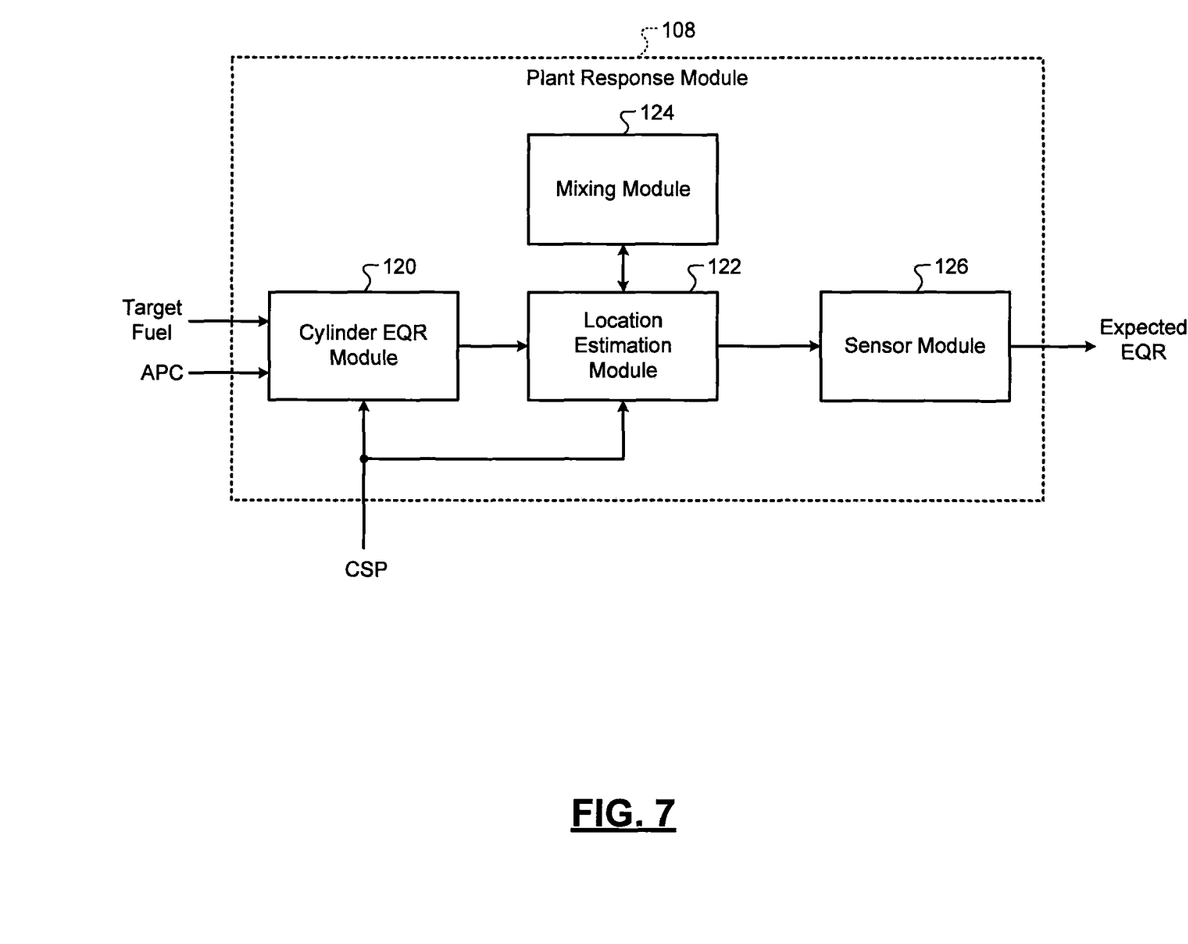
FIG. 7 is a functional block diagram of a plant response module according to the present disclosure.

Referring now to FIG. 7, the plant response module 108 may include a cylinder EQR module 120, a location estimation module 122, a mixing module 124, and a sensor module 126. The plant response module 108 may implement the calibrated exhaust model according to the present disclosure.

The cylinder EQR module 120 may estimate the EQR of the exhaust gas expelled from the cylinder 30 based on the APC value and the amount of fuel injected into the cylinder 30. The location estimation module 122 may estimate the location of the exhaust gas in the sections 52 of the exhaust manifold based on the geometry of the sections 52. The mixing module 124 may estimate the EQR of exhaust gas mixed at the junctions 54. The sensor module 126 may implement the sensor model. Accordingly, the sensor module 126 may determine the expected EQR at the pre-cat sensor 58 based on the sensor model.

Figure 8:
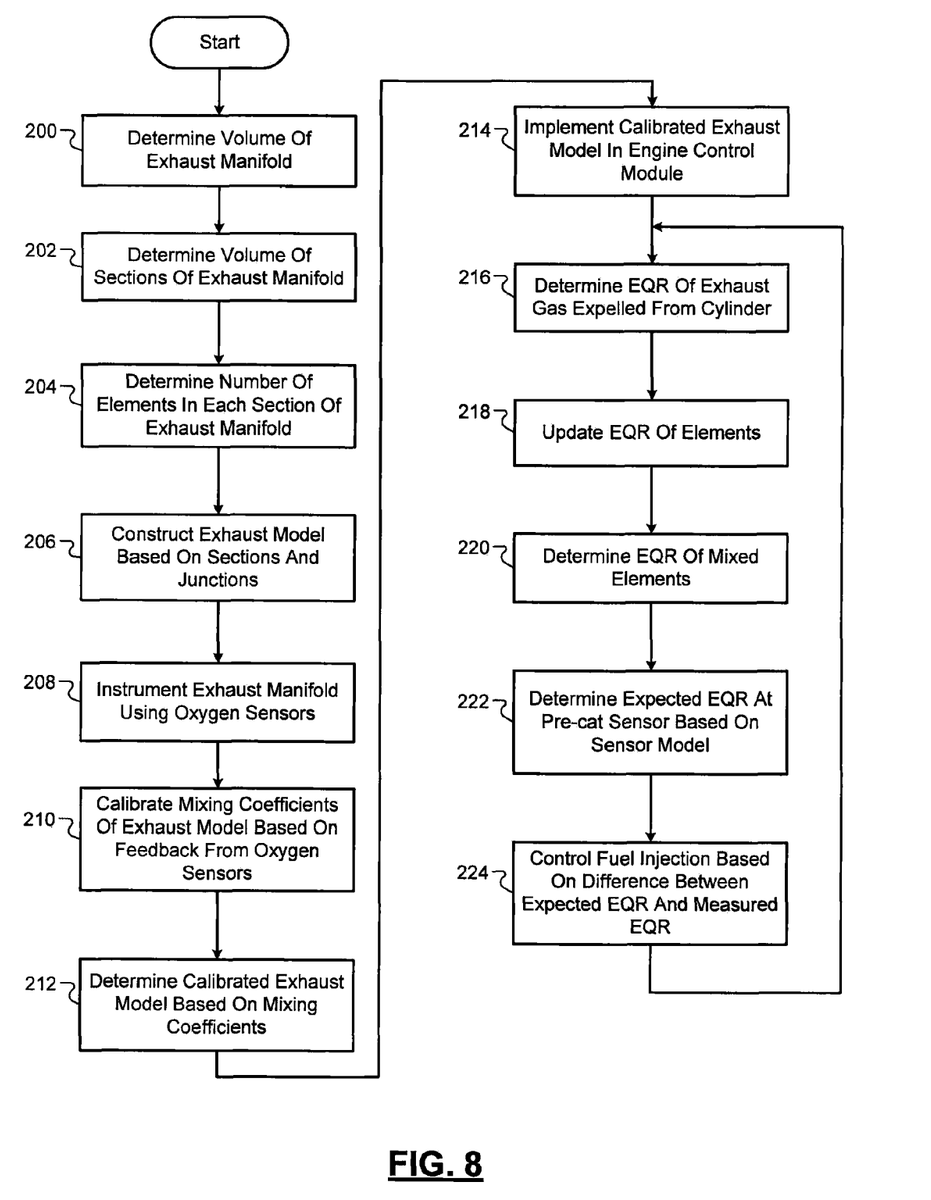
FIG. 8 illustrates a method for controlling the engine system based on the exhaust model according to the present disclosure.

Referring now to FIG. 8, a method for controlling an engine system based on an exhaust model begins at 200. At 200, control determines the volume of the exhaust manifold. At 202, control determines the volume of the sections of the exhaust manifold. At 204, control determines the number of elements in each section of the exhaust manifold. At 206, control constructs the exhaust model based on sections 52 and junctions 54. At 208, control instruments the exhaust manifold using the first oxygen sensor 104, the second oxygen sensor 106, and the pre-cat sensor 58. At 210, the exhaust model calibration module 102 calibrates the mixing coefficients of the exhaust model based on feedback from the first oxygen sensor 104, the second oxygen sensor 106, and the pre-cat sensor 58. At 212, the exhaust model calibration module 102 determines the calibrated exhaust model based on the mixing coefficients. At 214, control implements the calibrated exhaust model in the engine control module 32.

At 216, the cylinder EQR module 120 determines the EQR of exhaust gas expelled from a cylinder 30 of the engine 22. At 218, the location estimation module 122 updates the EQR of elements corresponding to the cylinder 30. At 220, the mixing module 124 determines the EQR of elements mixed at the junctions 54. For example, the mixing module 124 may determine the EQR of elements that are mixed at the junctions 54 while the location estimation module 122 is updating the EQR of the elements. At 222, the sensor module 126 determines the expected EQR at the location of the pre-cat sensor 58 based on the sensor model. At 224, the fuel control module 114 controls fuel injection based on a difference between the expected EQR and an EQR measured by the pre-cat sensor 58.

At 214, the plant response module 108 determines the expected EQR based on the calibrated exhaust model. At 216, the fuel control module 114 controls an amount of fuel injected based on a difference between the expected EQR and the measured EQR. At 218, the plant response module 108 updates the calibrated exhaust model based on an engine event (e.g., a firing of a cylinder 30).

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
a cylinder equivalence ratio (EQR) module that determines a first EQR corresponding to a first exhaust gas expelled from a first cylinder and that determines a second EQR corresponding to a second exhaust gas expelled from a second cylinder;
a location estimation module that determines when the first and second exhaust gases mix in an exhaust manifold to form a third exhaust gas having a third EQR;
a sensor module that estimates an EQR of a fourth exhaust gas based on the third EQR, wherein the fourth exhaust gas is located at an oxygen sensor in the exhaust manifold; and
a fuel control module that controls an amount of fuel supplied to an engine based on a difference between the estimated EQR and an EQR corresponding to measurements from the oxygen sensor.

2. The system of claim 1, wherein the fourth exhaust gas includes the third exhaust gas.

3. The system of claim 1, wherein the first exhaust gas is expelled into a first pipe of the exhaust manifold, wherein the second exhaust gas is expelled into a second pipe of the exhaust manifold, and wherein the first and second exhaust gases mix at a junction of the first and second pipes.

4. The system of claim 3, wherein the location estimation module models the first pipe as a group of discrete elements, wherein each element corresponds to a portion of a volume of the exhaust manifold, and wherein each element includes a corresponding EQR value.

5. The system of claim 4, wherein the location estimation module updates EQR values of the elements based on at least one of a position of a crankshaft and a firing of cylinders of the engine.

6. The system of claim 4, further comprising a mixing module that estimates the third EQR based on a mixing coefficient and an EQR value of an element of the first pipe adjacent to the junction of the first and second pipes.

7. The system of claim 3, wherein the location estimation module determines when the first and second exhaust gases mix based on a volume of the first pipe and a volume of the second pipe.

8. The system of claim 1, wherein the cylinder EQR module determines the first EQR based on an amount of air and fuel combusted in the first cylinder.

9. The system of claim 1, further comprising a mixing module that estimates the third EQR based on the first and second EQRs and a mixing coefficient.

10. The system of claim 1, wherein the estimated EQR of the fourth exhaust gas is an estimated response of the oxygen sensor, wherein the estimated response of the oxygen sensor is based on a model of the oxygen sensor.

11. A method comprising:
determining a first EQR corresponding to a first exhaust gas expelled from a first cylinder;
determining a second EQR corresponding to a second exhaust gas expelled from a second cylinder;
determining when the first and second exhaust gases mix in an exhaust manifold to form a third exhaust gas having a third EQR;
estimating an EQR of a fourth exhaust gas based on the third EQR, wherein the fourth exhaust gas is located at an oxygen sensor in the exhaust manifold; and
controlling an amount of fuel supplied to an engine based on a difference between the estimated EQR and an EQR corresponding to measurements from the oxygen sensor.

12. The method of claim 11, wherein the fourth exhaust gas includes the third exhaust gas.

13. The method of claim 11, wherein the first exhaust gas is expelled into a first pipe of the exhaust manifold, wherein the second exhaust gas is expelled into a second pipe of the exhaust manifold, and wherein the first and second exhaust gases mix at a junction of the first and second pipes.

14. The method of claim 13, further comprising modeling the first pipe as a group of discrete elements, wherein each element corresponds to a portion of a volume of the exhaust manifold, and wherein each element includes a corresponding EQR value.

15. The method of claim 14, further comprising updating EQR values of the elements based on at least one of a position of a crankshaft and a firing of cylinders of the engine.

16. The method of claim 14, further comprising estimating the third EQR based on a mixing coefficient and an EQR value of an element of the first pipe adjacent to the junction of the first and second pipes.

17. The method of claim 13, further comprising determining when the first and second exhaust gases mix based on a volume of the first pipe and a volume of the second pipe.

18. The method of claim 11, further comprising determining the first EQR based on an amount of air and fuel combusted in the first cylinder.

19. The method of claim 11, further comprising estimating the third EQR based on the first and second EQRs and a mixing coefficient.

20. The method of claim 11, wherein the estimated EQR of the fourth exhaust gas is an estimated response of the oxygen sensor, wherein the estimated response of the oxygen sensor is based on a model of the oxygen sensor.

* * * * *